United States Patent [19]

Boyer et al.

[11] Patent Number: 5,324,917
[45] Date of Patent: Jun. 28, 1994

[54] DEVICE AND METHOD FOR REGULATION THE TEMPERATURE AND/OR POWER OF A COOKING APPARATUS

[75] Inventors: Serge Boyer, Orleans; Didier Gouardo, Saran; Pierre Pitot, Orleans, all of France

[73] Assignee: Compagnie Europeenne Pour L'Equipement Menager-Cepem, St Jean De Ruelle, France

[21] Appl. No.: 836,264
[22] PCT Filed: Sep. 14, 1990
[86] PCT No.: PCT/FR90/00660
   § 371 Date: Feb. 28, 1992
   § 102(e) Date: Feb. 28, 1992
[87] PCT Pub. No.: WO91/04524
   PCT Pub. Date: Apr. 4, 1991

[30] Foreign Application Priority Data
   Sep. 15, 1989 [FR] France ................. 89 12105

[51] Int. Cl.$^5$ ............................. H05B 1/02
[52] U.S. Cl. ...................... 219/497; 219/492; 219/518; 340/589; 99/327; 99/332
[58] Field of Search ........... 219/518, 494, 492, 497, 219/501, 506; 340/588, 589; 99/325, 327, 332

[56] References Cited
   U.S. PATENT DOCUMENTS
   4,587,406  5/1986  Andre ..................... 219/497

FOREIGN PATENT DOCUMENTS
   0146780  7/1985  European Pat. Off. .
   3736005  5/1989  Fed. Rep. of Germany .
   2577740  8/1986  France .

Primary Examiner—Mark H. Paschall
Attorney, Agent, or Firm—Oblon, Spivak, McClelland, Maier & Neustadt

[57] ABSTRACT

A device and method for regulating a cooking apparatus. In order to obtain an effective servocontrol of the desired temperature with a cooking surface, when cooking for example by induction, a servocontrol curve is used in the plane (i.e., temperature, variation of the temperature as a function of time). Each time the curve is crossed the heating power is cut off or reduced. The device and method applies principally to monitoring of the heating device. The device according to the present invention is particularly well adapted to cooking surfaces and especially to cooking surfaces wherein cooking is done by induction.

8 Claims, 8 Drawing Sheets

DEVICE AND METHOD FOR REGULATION THE TEMPERATURE AND/OR POWER OF A COOKING APPARATUS

BACKGROUND OF THE INVENTION

1. Field of the Invention

The invention relates principally to a device and to a method for regulation especially of the temperature and/or of the power of a cooking apparatus.

2. Discussion of the Background

It is known for electrical cooking apparatuses to associate a device for measurement of temperature with a device for regulation.

These apparatuses have the aim, after an initial period of pre-heating, of maintaining substantially constant the temperature of a heating receptacle. However, the temperature of the sensor or, preferably, of the recipient is regulated, and not its contents. In fact, in order to deduce the temperature of the contents from the temperature of the sensor, it would be necessary to know the development of the temperature. Now, the correlations between temperature of the sensor and that of the contents of the cooking receptacle vary (sic) from one cooking operation to the next and sometimes even in the course of a single cooking operation. This relation varies, for example, between a frying pan with one liter of oil and a shallow cast-iron saucepan with 3 liter of oil or a cast-iron grill pan. The addition, of, for example, 800 grams of chips in the course of cooking completely modifies the temperature of the contents of the receptacle and influence only after a certain delay and in a damped fashion the variation of the temperature of the sensor.

SUMMARY OF THE INVENTION

The device according to the present invention has the aim of limiting the temperature of the receptacle in order:
to avoid damaging the cooking surface;
avoid the oil catching fire and risk causing a fire
avoid damaging the receptacle.

Moreover, the invention also has the aim of bringing the contents of a receptacle as quickly as possible to a desired temperature, for example 180° C. in the case of oil, without ever exceeding a maximum temperature of for example 400° C. in the case of a film of oil.

In the device according to the present invention, servocontrol is performed by derivation of a servocontrol curve in the plane (temperature, variation of the temperature with time). The servocontrol curve shears the plane into two distinct surfaces. As long as the curve is not reached, heating is performed at full power. As soon as the curve is crossed the heating power is reduced or stopped. When the temperature sensor has detected in the phase diagram the passing from the other side of the servocontrol curve, heating is again performed at full power or the power is increased.

The subject of the invention is mainly a monitor apparatus, a heating element and a temperature sensor characterized by the fact that the monitor device incorporates means of evaluating the variation in time t of the temperature $\theta$.

The subject of the invention is also a heating apparatus incorporating a monitor device, a heating element and a temperature sensor, characterized by the fact that the monitor device incorporates means of calculating the derivative of the temperature $\theta$ with respect to time t.

The subject of the invention is also an apparatus characterized by the fact that the monitor device provides a servocontrol curverbose points have as the abscissa the temperature $\theta$ and as the ordinate the derivative with respect to time of the temperature $d\theta/dt$ and that it incorporates means which make it possible to stop or to reduce the electrical supply to the heating element every time the value of $d\theta/dt$ exceeds the value of the ordinate of the curve for an abscissa corresponding to the temperature reached.

The subject of the invention is also an apparatus characterized by the fact that the monitor device provides a curve whose points have as the abscissa the temperature $\theta$ and as the ordinate the derivative $d\theta/dt$ with respect to time t of the temperature $\theta$, the crossing of which indicates that an empty cooking receptacle is present or that no cooking receptacle is present on the heating element and the means for cutting off the electrical supply to the heating element if the curve is crossed.

The subject of the invention is also an apparatus characterized by the fact that the apparatus is a cooking surface.

The subject of the invention is also an apparatus characterized by the fact that the apparatus is a cooker.

The subject of the invention is also an apparatus characterized by the fact that it incorporates a vitro-ceramic hob.

The subject of the invention is also an apparatus characterized by the fact that the heating element is an inductor.

The subject of the invention is also a method of heating a receptacle to bring it to a predetermined temperature $\theta$ characterized by the fact that it incorporates the stages:
of heating with an electrical heating element,
of measuring the temperature reached $\theta$,
of calculating the derivative $d\theta/dt$ of the temperature with respect to time t, and
of cutting off or reducing the power of the electrical supply every time the value of $d\theta/dt$ exceeds a predetermined value for the value of $\theta$ reached.

The subject of the invention is also a method characterized by the fact that it incorporates the stages of:
detecting the absence of a receptacle to be heated or the presence of an empty receptacle on the heating element by comparison of the value of $d\theta/dt$ with respect to the maximum value corresponding to a receptacle with its contents for the value $\theta$ of the temperature reached,
cutting off the electrical supply of the heating element if the presence of a receptacle with contents has not been detected.

BRIEF DESCRIPTION OF THE DRAWINGS

The invention will be better understood by means of the description hereafter and the attached figures given as non-limiting examples among which.

DESCRIPTION OF THE PREFERRED EMBODIMENT

In FIGS. 1 to 13, the same references have been used to designate the see elements.

Figure 1:
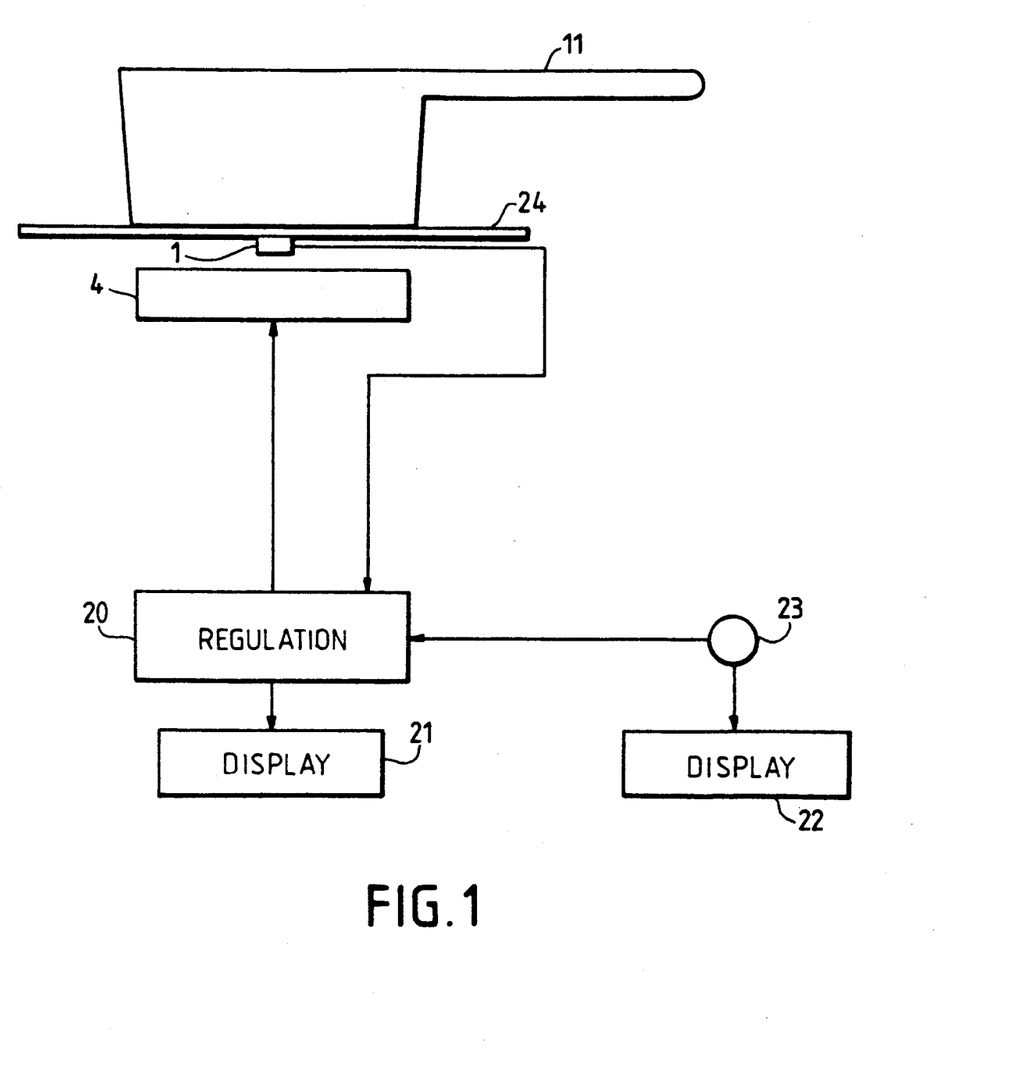
FIG. 1 is a diagram of a first example of embodiment of the device according to the present invention.

In FIG. 1 can be seen an embodiment of a heating device according to the present invention. The device according to the present invention incorporates the control device 23 connected to a monitor device 20. The monitor device 20 is connected to a source of heat 4. The source of heat 4 is intended to raise the temperature of a receptacle 11 and its contents. A temperature sensor 1 is connected to the monitor device 20. Advantageously, the monitor device 20 is connected to a display device 21. Advantageously, the control device 23 is connected to a display device 22.

The heating device 4 is, for example, a gas burner, advantageously of the sequential type.

Advantageously, the heating device 4 is an electrical heating device.

More particularly, the heating device 4 is preferably an inductor intended to induce electrical currents in the receptacle 11.

Advantageously, a vitro-ceramic hob is interposed between the heating device 4 and/or the temperature sensor 1 and the receptacle 11.

In the example illustrated in this application, cooking surfaces have been described. It goes without saying that the use of cookers or cooking enclosures of the oven type do not depart from the scope of the present invention.

The control device 23 makes it possible to choose the rate of heating, the temperature or the cooking program. The display 22 displays the temperature or the chosen program. The display is done in numerical or alphanumerical fashion or by symbols. The monitor device 20 controls the heating device 4 in order to execute the chosen program or in order to arrive at the desired temperature. For that reason, the monitor device 20 uses the reference information transmitted by the control device 23 and the temperature data measured by the sensor 1. The display device 21 displays the ti/ne of day, the remaining cooking time, the actual temperature or service messages.

Figure 2:
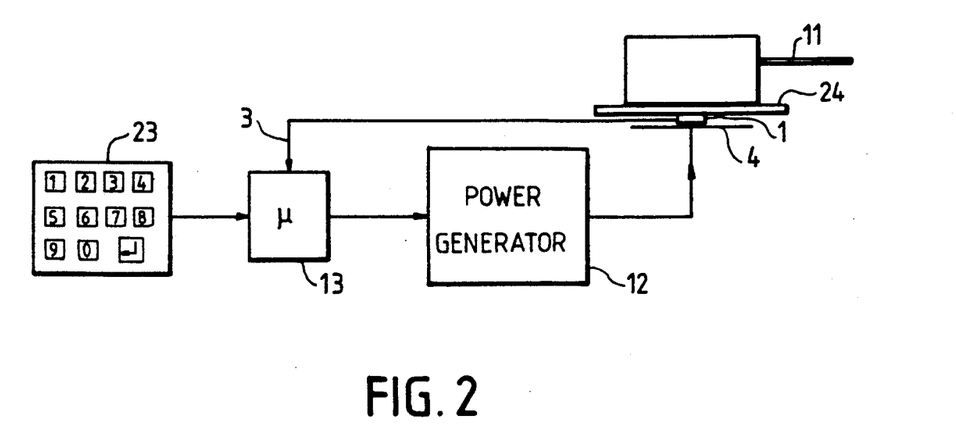
FIG. 2 is a diagram of a second example of embodiment of the device according to the present invention.

In FIG. 2, can be seen a particularly advantageous embodiment of the device according to the present invention. The device in FIG. 2 incorporates an inductor 4 supplied by a power generator 12. The power generator 12 is monitored by a microprocessor 13 as a function of the orders received from the control device 23 and from the temperature information 3 coming from the temperature sensor 1. The microprocessor 13 uses programmes which makes it possible to reach the desired temperature as rapidly as possible without the risk of damaging the receptacle 11 or the cooking surface.

For example, the microprocessor 63705 sold by the HITACHI company is used.

Figure 3:
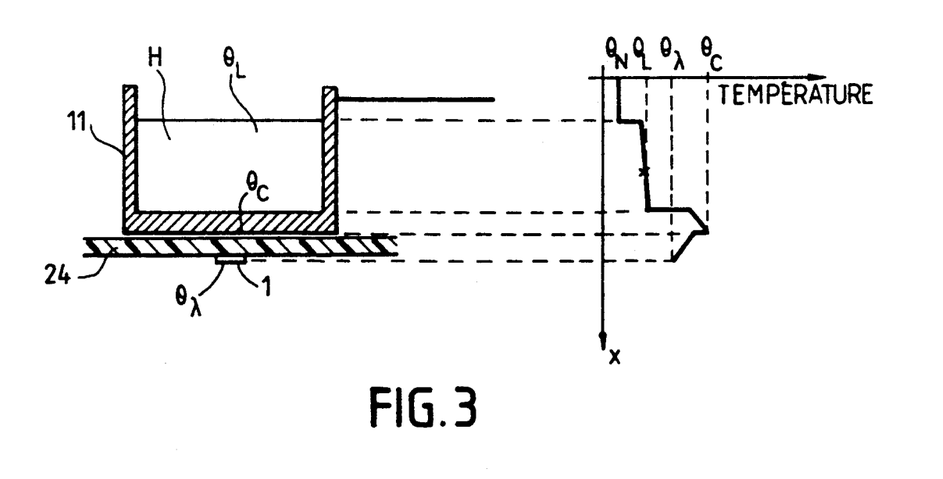
FIG. 3 is a diagram illustrating the spatial variation of the temperature for a saucepan filled with oil placed on a vitro-ceramic hob.

In FIG. 3, can be seen the various temperatures reached at various points of a saucepan 11 filled with an oil H. The temperature at the surface of the oil is different from the temperature of the air $\theta_N$. The temperature $\theta$, rises rapidly inside the oil to become relatively stable and equal to $\theta_l$ % down to the bottom of the saucepan then rises more abruptly at the inner bottom interface 8 of the saucepan. The temperature rises less abruptly going from the inside towards the outside of the saucepan to reach the maximum $\theta_c$ at the outer bottom of the saucepan. The temperature goes down in the vitroceramic hob 24 to reach the temperature $\theta_\lambda$ of the temperature sensor 1.

The variation illustrated in FIG. 3 corresponds to the device in FIG. 2. It can be experimentally determined for any type of saucepan for a given type of cooking apparatus. FIG. 3 corresponds to the maximum power. The deviation between $\theta_c$ and $\theta_L$ increases with power. Thus if the heating is stopped, it is possible that $\theta_L$ becomes greater than $\theta_c$. In addition, the temperature deviations change in the course of cooking and as a function of the contents (nature, quantity) of the saucepan 11.

The device according to the present invention performs servocontrol of the temperature $\theta_L$ of the contents of the saucepan 11 and not $\theta_{80}$ of the sensor 1.

Figure 4:
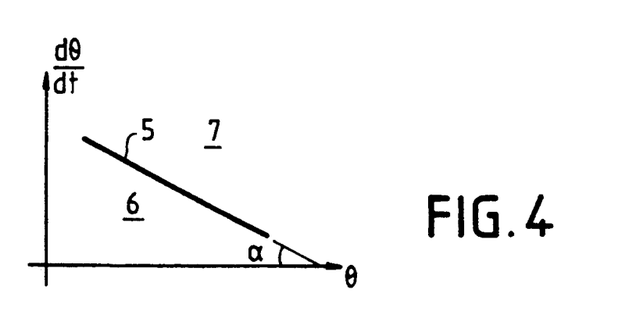
FIG. 4 is an explanatory diagram of the principle employed in the invention.
Figure 5:
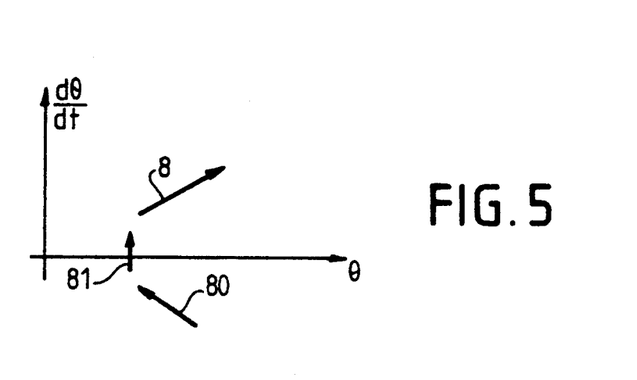
FIG. 5 is a diagram illustrating the development of the system during use of maximum power.

In FIG. 4, can be seen an embodiment of a servocontrol curve 5 employed in the device according to the present invention. The curve 5 represents the temperature $\theta$ as a function of the derivative $d\theta/dt$ of the temperature $\theta$ with respect to time t. The curve 5 delimits a region 6 and a region 7 of the plane. In order to arrive at an effective cooking apparatus, it is a question, as illustrated in FIG. 5, of reaching the servocontrol 5 of FIG. 4 as rapidly as possible. The arrow 8 indicates the development in a phase diagram for example, using full power. The arrow 81 indicates the development in a phase diagram around $d\theta/dt=0$. The arrow 80 indicates the development in a phase diagram for the negative values of $d\theta/dt$.

Figure 6:
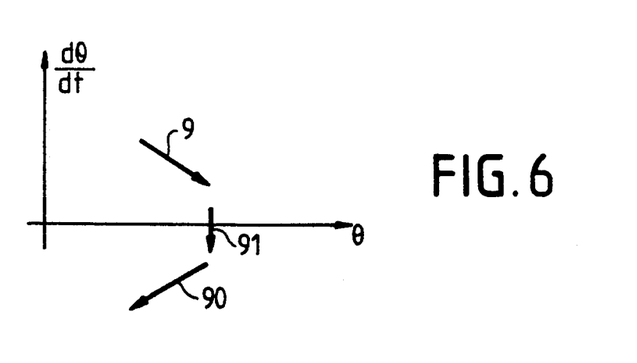
FIG. 6 is a diagram illustrating the development of the system in the absence of heating.

However, it is a question of minimizing the incursions into the region 7 of the phase diagram. For that reason the electrical power is reduced or the electrical power is cut off if the curve 5 is exceeded. The arrow 9 of FIG. 6 illustrates the development in the case of zero power. The curve 5 is therefore going to be crossed in the other direction. From that moment either full power or reduced power can be reapplied in order to follow this curve. The arrow 91 illustrates the development in a phase diagram around $d\theta/dr=0$. The arrow 90 illustrates the development in a phase diagram for negative values of $d\theta/dt$.

In one particularly advantageous variant of the device according to the present invention, the variation of the power is a function of the distance to the servocontrol curve 5. Thus, the oscillations are limited. The reduction in power as a function of the distance from the servocontrol curve 5 is not necessarily linear.

It goes without saying that in use other servocontrol curves 5 as, for example, straight segments, ellipses or hyperboles do not depart from the scope of the present invention.

The servocontrol curves 5 are, for example, determined experimentally for various cooking apparatuses, and for the various cooking receptacles or programs desired.

Figure 7:
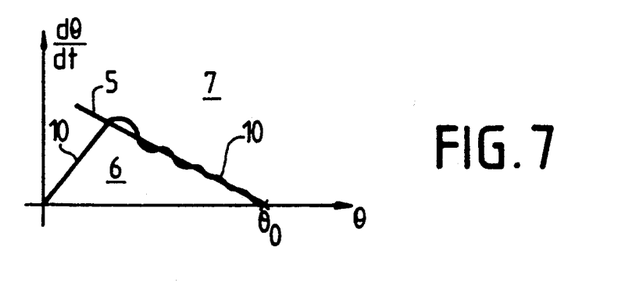
FIG. 7 illustrates the development of the temperature until the desired temperature $\theta_o$ is reached.

In FIG. 7 can be seen an example of development 10 of the state of a cooking apparatus up until the point when the reference temperature $\theta_o$ is obtained.

However, it is imperative to take account of thermal inertia, for example in the case of heating by induction, of the time that the heat takes to propagate from the bottom of the saucepan 11 towards the temperature sensor 1.

Figure 8A:
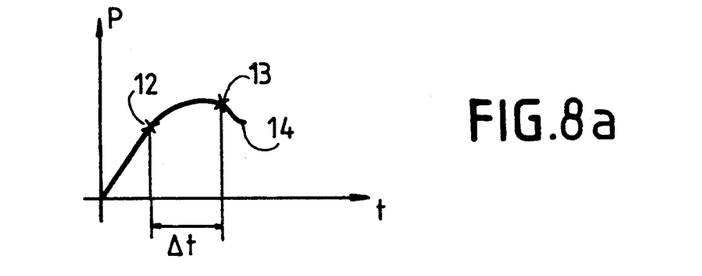
FIGS. 8A thru 8C show a diagram illustrating the influence of thermal inertia.

In FIG. 8 can be seen the curve 14 representing the development of the power as a function of time. This curve corresponds to servocontrols using for experimentation temperature sensors actually placed inside a saucepan.

Figure 8B:
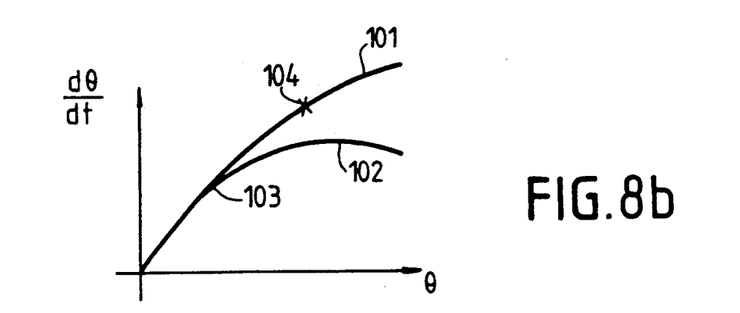

In order to determine an ideal servocontrol curve, the development of the state of the sensor is traced for different empty saucepans and the point 103 of FIG. 8b is plotted on a diagram each time it would have been necessary to reduce or cut off the electrical power. It is absolutely necessary to reduce the power before these points 103. The curve 101 corresponds to an empty saucepan, the curve 102 to the reduction in the required power and the point 104 to the oil being set on fire.

Figure 8C:
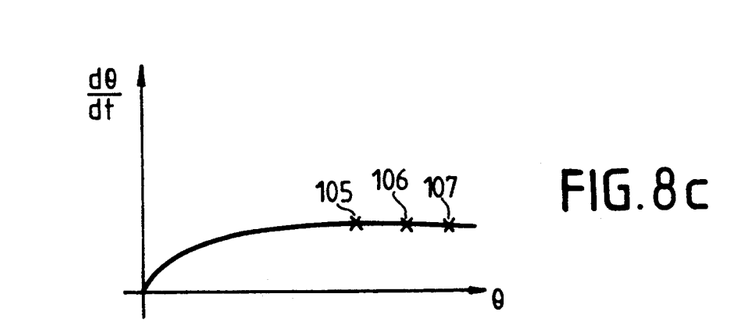

Moreover, as can be seen in FIG. 8c, this time the same type of operation is performed for saucepans of different types filled with oil with quantities ranging from, for example 0.5 liters to 3 liters. The points 105 and 106 corresponding respectively to 150° C. in the oil and 110° C. in the oil are plotted on the diagram. Art attempt is made to make the curve pass between the maximum of the points corresponding to 150° C. and the minimum of the points corresponding to 170° C. and, obviously, below points 103. The point 108 corresponds to a temperature in the oil equal to 180° C.

Figure 9:
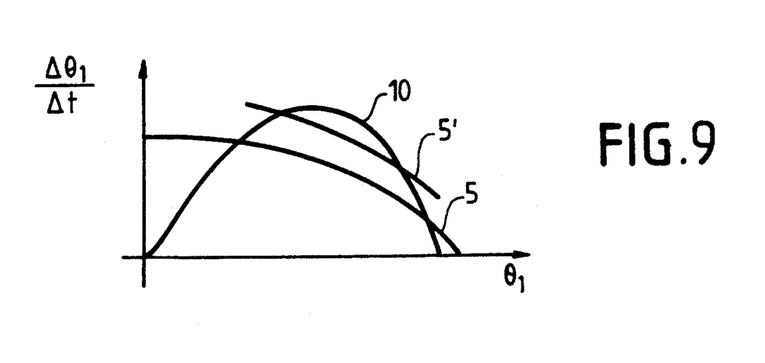
FIG. 9 is a diagram illustrating the principle of detection of empty saucepans or the absence of a saucepan on the cooking device.

As soon as the curve 5' is exceeded, the heating power is cut off completely and effectively for this cooking operation in order to let the saucepan or the vitro-ceramic hob cool down. The crossing of the curve 5 is a lapse on the part of the housewife. This device makes it possible to save energy and above all to avoid the accidents which can come about in the case of an overheated saucepan. In addition, it is certain that the overheated saucepan is not going to damage the vitro-ceramic cooking surface 24, the inductor 4 or the temperature sensor 1.

Figure 10:
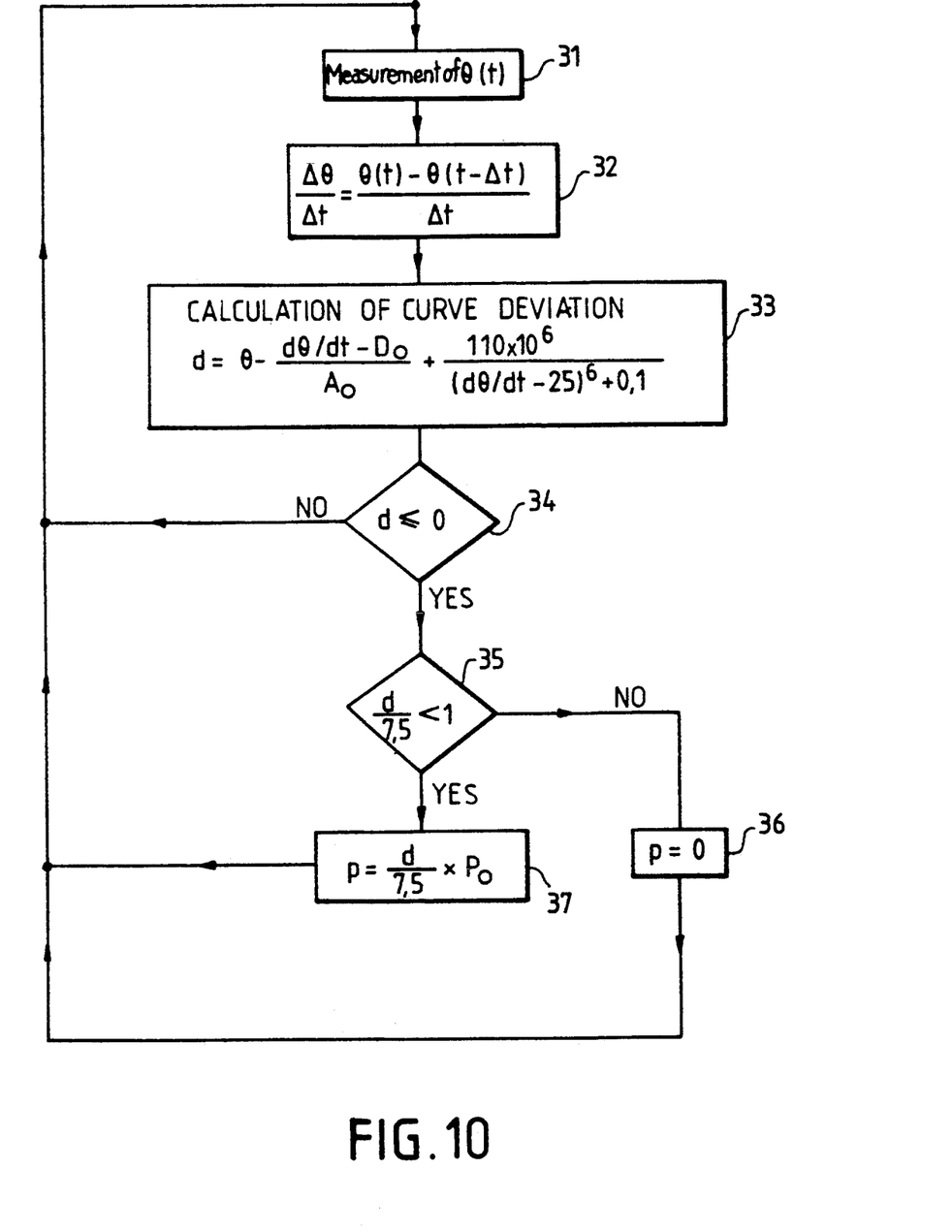
FIG. 10 is an example of a flow chart for programs employed in the device according to the present invention.

In FIG. 10 can be seen an example of a flow chart employed by the microprocessor 13 of FIG. 2.

At 31, the temperature is measured.
Go to 32.
At 32, the calculation of the variation of the temperature as a function of time is performed.
Go to 33.
At 33, the calculation is performed of the deviation of temperature d to the curve along the axis of $\theta$ for example given by the formula $$d = \theta - (d\theta/dt - D_o)A_o + 1 \ 10 \times 10^6 / ((d\theta/dt - 25)^6 + 0.1)$$

For example for a reference temperature $\theta_o = 236°$, $D_o = 26$ and $A_o = D_o\theta_o$.
Go to 34.
At 34, the test is carried out to find out if the distance to the curve 5 is less than or equal to 0.
If not, go to 31.
If yes, go to 35.
At 35, it is determined whether the distance to the curve 5 is small.
If not go to 36.
At 36, the power p is reduced to 0.
Go to 31.
If yes, go to 37.
At 37, the reduced power to be applied to the inductor is determined. The power is determined, for example by the formula $$p = (d:7.5) \times P_o, \ P_o \text{ being the initial power.}$$

Go to 31.
The program followed until the end of the cooking operation.

Figure 11:
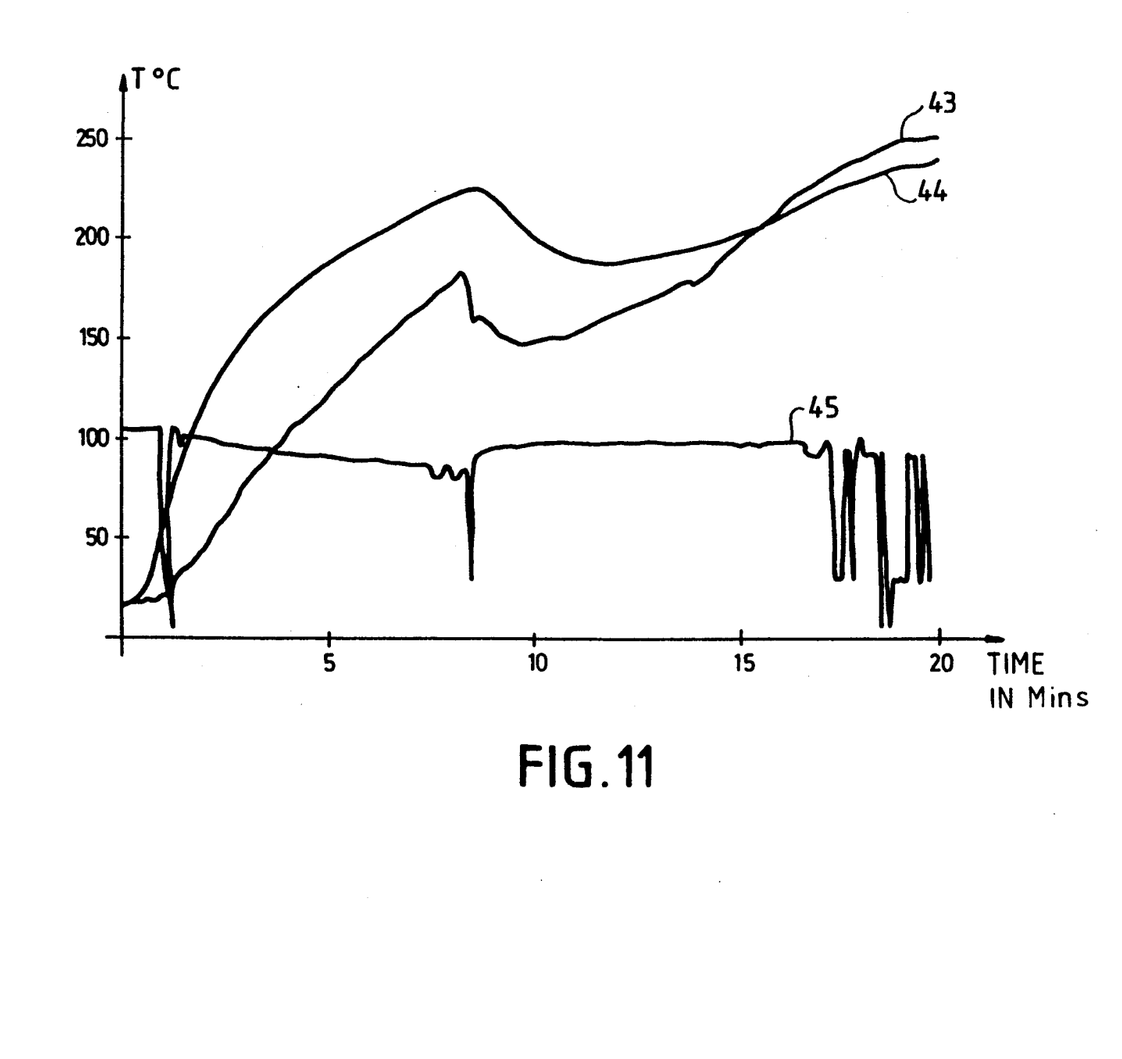
FIG. 11 incorporates two curves of development of the temperature and one curve of development of the power.

In FIG. 11 can be seen an example of an experimental curve of temperature as a function of time. The curve 44 corresponds to the temperature of the oil while the curve 43 corresponds to the temperature of the sensor. The power supplying the heating device has been plotted on a time scale.

Figure 12:
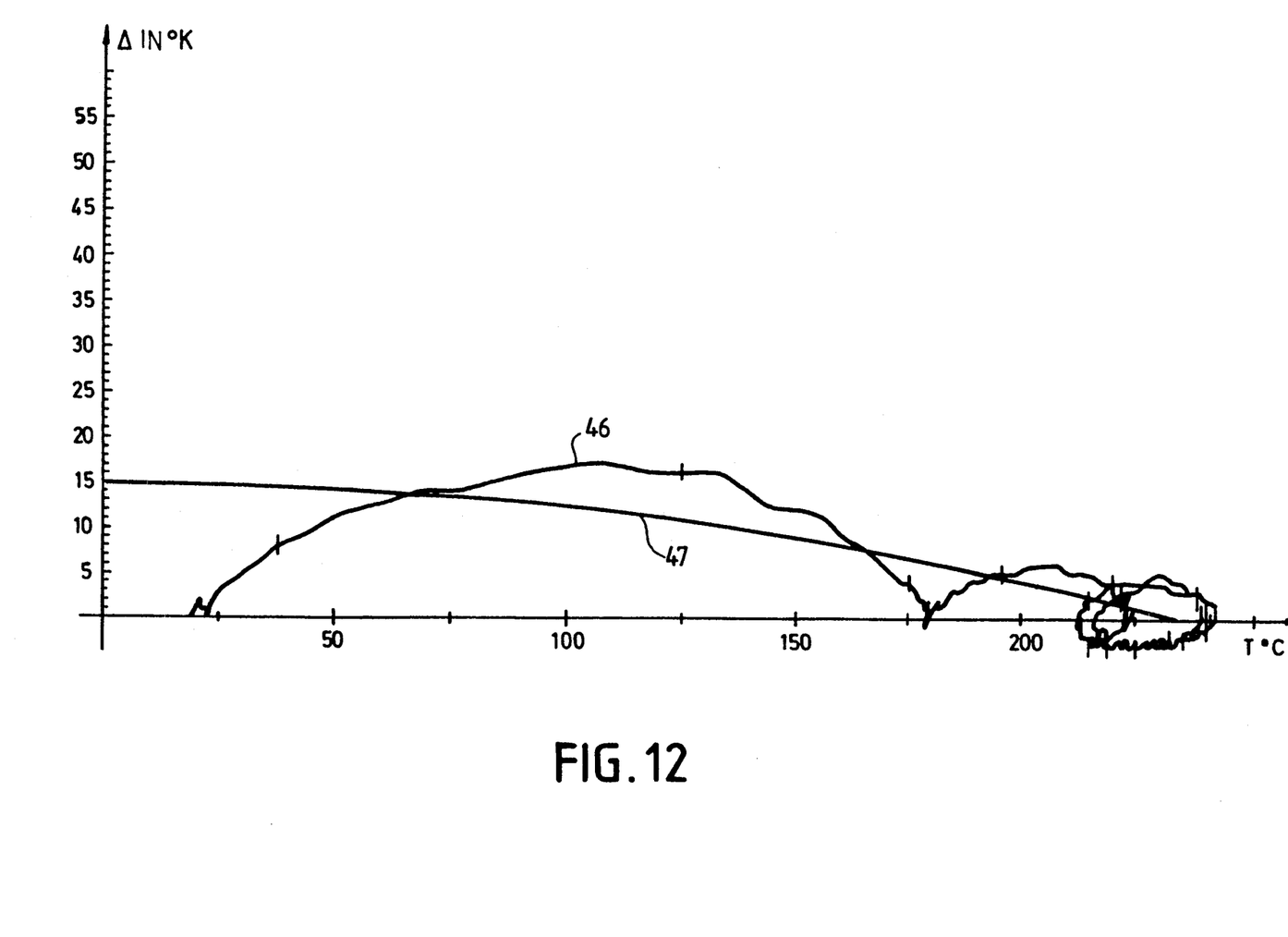
FIG. 12 incorporates the servocontrol curve and the state curve in the case of servocontrol of a cooking surface having an inductor of large diameter.

In FIG. 12 can be seen the servocontrol curve 47 greatly exceeded by a state curve 46 in the case of use of an empty cast-iron grill pan by using a program for the cooking of chips. The conditions of the experiment correspond to a cast-iron grill pan sold by the LE CREUSET company having a diameter of 230 mm and a height of 17 cm. The temperature sensor was a negative temperature coefficient resistor placed directly against a vitro-ceramic hob. The variation of the temperature and the temperature of the sensor are expressed in degrees celsius.

It goes without saying that it is advantageous, as soon as the curve 47 is greatly exceeded by the curve 46, to cut off the electrical power in sofaras it has been detected that an empty saucepan is present and to prevent the temperature rise which can be seen in FIG. 12.

Figure 13:
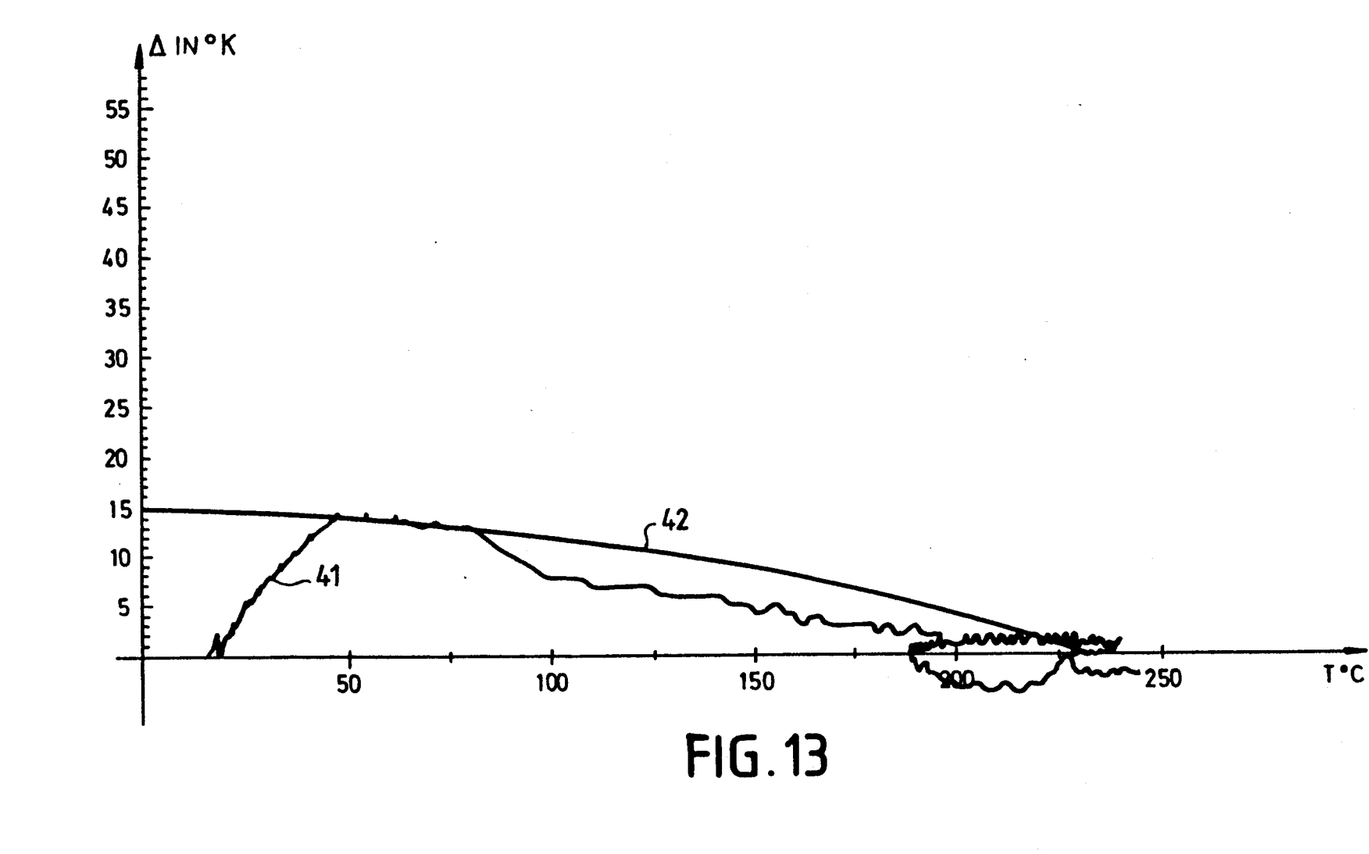
FIG. 13 incorporates a servocontrol curve and a state curve illustrating the development of the temperature in the device according to the present invention.

In FIG. 13 can be seen a servocontrol curve 42 and a state curve 41 corresponding to a full saucepan and a temperature sensor incorporating a negative temperature constant diode which is electrically isolated by mica from the vitro-ceramic hob.

The present invention applies principally to the monitoring of the heating device. The device according to the present invention applies particularly well to cooking surfaces and especially to cooking surfaces cooking by induction.

We claim:

1. Method of heating using a heating apparatus comprising a heating element, an electrical supply for supplying power to said heating element, a monitor device for controlling said electrical supply, and a temperature sensor delivering a measured temperature ($\theta_c$) to said monitor device, wherein said monitor device further provides a predetermined servocontrol curve representative of a derivative of temperature with respect to time ($d\theta/dt$) as a function of temperature ($\theta$), and includes a device for calculating the derivative of said measured temperature ($\theta_c$) with respect to the time ($d\theta_c/dt$) and for determining a measured point which has, as the abscissa, said measured temperature ($\theta_c$), and as the ordinate, the calculated derivative of said measured temperature (d$\theta_c$/dt), said device for calculating the derivative of said measured temperature further applying modified power to said electrical supply each time said measured point is not on said servocontrol curve, said modified power being chosen such that said measured point gets closer to said predetermined servocontrol curve, which method comprises:

heating with the electric heating element, measuring the temperature reached ($\theta$), calculating the derivative of the measured temperature (d$\theta$/dt) with respect to time (t), and altering the power of the electrical supply each time the value of the measured point exceeds a predetermined value for the value of the temperature ($\theta$) reached.

2. Method according to claim 1, which comprises:

detecting the absence of a receptacle to be heated or the presence of an empty receptacle on the heating element by comparison of the value of the derivative of the measured temperature (d$\theta$/dt) with respect to the maximum value corresponding to a receptacle with its contents for the value of the temperature ($\theta$) reached, and cutting off the electrical supply of the heating element if the presence of a receptacle with contents has not been detected.

3. A heating apparatus comprising a heating element, an electrical supply for supplying power to said heating element, a monitor device for controlling said electrical supply, and a temperature sensor for delivering a measured temperature ($\theta_c$) to said monitor device, wherein said monitor device further provides a predetermined servocontrol curve representative of a derivative of temperature with respect to time (d$\theta$/dt) as a function of temperature ($\theta$), and includes a device for calculating the derivative of said measured temperature ($\theta_c$) with respect to the time (d$\theta_c$/dt) and for determining a measured point which has, as the abscissa, said measured temperature, and as the ordinate, the calculated derivative of said measured temperature (d$\theta_c$/dt), said device for calculating the derivative of said measured temperature further applying modified power to said electrical supply each time said measured point is not on said servocontrol curve, said modified power being chosen such that said measured point gets closer to said predetermined servocontrol curve.

4. A heating apparatus according to claim 3, wherein said modified power has a value which is a function of the distance from said measured point to said servocontrol curve.

5. A heating apparatus according to claim 4, wherein said value is equal to zero when said distance is greater than a predetermined value.

6. A heating apparatus according to claim 3, wherein said modified power has a value which is a function of the time during which said measured point is not on said servocontrol curve.

7. A heating apparatus according to claim 3, wherein said heating element comprises an inductor.

8. A heating apparatus according to claim 3, wherein said temperature sensor is located under a vitroceramic hob.

* * * * *

UNITED STATES PATENT AND TRADEMARK OFFICE
CERTIFICATE OF CORRECTION

PATENT NO. : 5,324,917
DATED : JUNE 28, 1994
INVENTOR(S) : SERGE BOYER ET AL

It is certified that error appears in the above-indentified patent and that said Letters Patent is hereby corrected as shown below:

Column 5, line 43, change "108" to --107--;

Please substitute the attached figures 8a-9 for figures 8a-9 previously filed.

Signed and Sealed this

Twelfth Day of March, 1996

*Attest:*

BRUCE LEHMAN

*Attesting Officer*     Commissioner of Patents and Trademarks